(12) United States Patent
Moune

(10) Patent No.: US 9,505,488 B2
(45) Date of Patent: *Nov. 29, 2016

(54) ENERGY PROTECTION METHOD AND DEVICE FOR AN AIRCRAFT

(71) Applicant: Airbus Operations (SAS), Toulouse (FR)

(72) Inventor: Marie-Claire Moune, Tournefeuille (FR)

(73) Assignee: Airbus Operations (SAS), Toulouse (FR)

( * ) Notice: Subject to any disclaimer, the term of this patent is extended or adjusted under 35 U.S.C. 154(b) by 0 days.

This patent is subject to a terminal disclaimer.

(21) Appl. No.: 14/922,420

(22) Filed: Oct. 26, 2015

(65) Prior Publication Data

US 2016/0129992 A1 May 12, 2016

(30) Foreign Application Priority Data

Nov. 6, 2014 (FR) ..................... 14 60707

(51) Int. Cl.
*B64C 15/02* (2006.01)
*B64D 25/00* (2006.01)
*B64D 31/06* (2006.01)
*B64D 31/10* (2006.01)

(52) U.S. Cl.
CPC .............. *B64C 15/02* (2013.01); *B64D 25/00* (2013.01); *B64D 31/06* (2013.01); *B64D 31/10* (2013.01)

(58) Field of Classification Search
CPC ...... G01C 23/00; G08G 5/02; G05D 1/0638; B64D 19/00; B64D 31/06; B64D 25/00; B64D 31/10; B64D 45/04; B64D 43/00; G06F 3/0484; G06F 3/0486; G06F 9/4443; G06F 9/543

USPC .................. 701/3, 4, 14; 340/945, 971, 973; 244/175, 181, 182, 191, 195; 715/769

See application file for complete search history.

(56) References Cited

U.S. PATENT DOCUMENTS 6,062,513 A * 5/2000 Lambregts ........... G05D 1/0638
244/175
8,352,099 B1 1/2013 Eggold et al.
8,694,184 B1 * 4/2014 Boorman ............... G01C 23/00
340/945

(Continued)

FOREIGN PATENT DOCUMENTS

FR 2890645 3/2007
FR 2973777 10/2012

OTHER PUBLICATIONS

French Search Report, Jul. 8, 2015.

*Primary Examiner* — McDieunel Marc
(74) *Attorney, Agent, or Firm* — Greer, Burns & Crain, Ltd.

(57) ABSTRACT

An energy protection device comprising an activation unit for, in a low energy situation, automatically activating an energy protection function comprising automatically engaging an autothrust and automatically controlling the engines of the aircraft for the engines to supply a maximum thrust, an auxiliary monitoring unit configured to perform a monitoring to detect an absence of activation of a protection mode by at least one of the engines of the aircraft although an activation command has been transmitted, and a disconnection unit to automatically disconnect the autothrust in case of the detection of such a situation, a disconnection of the autothrust resulting in the triggering of the protection function being stopped.

9 Claims, 3 Drawing Sheets

(56) References Cited

U.S. PATENT DOCUMENTS

| | | | |
|---|---|---|---|
| 8,838,295 B2* | 9/2014 | Moune | B64D 31/06 701/3 |
| 9,032,319 B1* | 5/2015 | Hammack | G06F 3/0486 715/769 |
| 9,159,241 B1* | 10/2015 | Murphy | G08G 5/02 |
| 9,205,916 B2* | 12/2015 | Boorman | G01C 23/00 |
| 2008/0208398 A1 | 8/2008 | Delaplace et al. | |
| 2013/0110324 A1 | 5/2013 | Moune et al. | |
| 2014/0188312 A1* | 7/2014 | Boorman | G01C 23/00 701/3 |
| 2014/0346280 A1* | 11/2014 | Constans | B64C 19/00 244/175 |
| 2015/0191251 A1* | 7/2015 | Moune | B64C 13/503 244/195 |

\* cited by examiner

ENERGY PROTECTION METHOD AND DEVICE FOR AN AIRCRAFT

CROSS-REFERENCES TO RELATED APPLICATIONS

This application claims the benefit of the French patent application No. 14 60707 filed on Nov. 6, 2014, the entire disclosures of which are incorporated herein by way of reference.

BACKGROUND OF THE INVENTION

The present invention relates to an energy protection method and device for an aircraft, notably a transport airplane.

More specifically, this device is intended to protect the aircraft against situations of low energy (low speed, high incidence, low engine thrust), notably close to the ground.

Generally, such a device comprises, as described for example in the document FR-2 890 645 or in the document FR-2 973 777:
- a monitoring unit for monitoring, during a flight of the aircraft, automatically and repetitively, a plurality of data of the aircraft so as to be able to detect a low energy situation, for which conditions relating to a low energy are fulfilled; and an activation unit for automatically activating, in case of the detection of such a low energy situation, a protection function called ALPHA FLOOR, consisting in automatically engaging an autothrust system ("ATHR") and in automatically controlling the engines of the aircraft for them to supply a maximum thrust.

The ALPHA FLOOR protection function which is defined in a control and guidance computer of FCGC ("Flight Control and Guidance Computer") type, therefore generates, in the cases where the aircraft is in a low energy situation, an automatic increase in the thrust to the maximum engine thrust, and does so regardless of the initial position of the throttle controls of the aircraft.

The activation of the ALPHA FLOOR protection function generates, generally, the following actions:
- a display of a corresponding message on a flight mode indicator of the aircraft of FMA ("Flight Mode Annunciator") type;
- an application of the maximum engine thrust; and
- an automatic engagement of the autothrust (ATHR).

However, it can sometimes happen that one of the engines of the aircraft cannot engage a protection mode corresponding to the ALPHA FLOOR protection function, for example, in the event of failure. If the implementation of the ALPHA FLOOR protection function was authorized in such a case, it would lead to a strong thrust imbalance (the valid engine applying the maximum thrust, and the failed engine applying the minimum thrust, for an aircraft provided with two engines), which would make the aircraft difficult to control, particularly at low speed. This situation therefore requires particular management.

SUMMARY OF THE INVENTION

An object of the present invention is to simplify the management of an energy protection function of ALPHA FLOOR type for an aircraft, if one of the engines of the aircraft cannot engage its protection mode corresponding to this protection function. It relates to an energy protection method for an aircraft which is provided with a plurality of engines and an autothrust, said method having a protection function comprising automatically engaging the autothrust if it is not already engaged and automatically increasing the thrust of the engines to a maximum thrust when conditions for triggering the protection function are fulfilled, said method comprising, for the triggering of the protection function, a step of transmission of an activation command to each of the engines of the aircraft and a step of activation of a corresponding protection mode by each of the engines in response to the transmission of the activation command.

According to the invention, the method further comprises:
- a monitoring step comprising performing a monitoring so as to be able to detect an absence of activation of the protection mode by at least one of said engines although an activation command has been transmitted; and
- a disconnection step comprising automatically disconnecting the autothrust, in case of the detection of an absence of activation of the protection mode by at least one engine although an activation command has been transmitted, a disconnection of the autothrust resulting in the triggering of the protection function being stopped.

Thus by virtue of the invention, in case of the detection of an absence of activation of the protection mode by at least one engine although an activation command for a protection function (of ALPHA FLOOR type) has been transmitted, the energy protection method generates a disconnection of the autothrust, which results in the triggering of the protection function being stopped, and thus makes it possible to simplify the management of the protection function in this situation where an engine of the aircraft cannot engage the corresponding protection mode.

In a preferred embodiment, the method comprises an auxiliary step comprising, in case of the detection of an absence of activation of the protection mode by at least one engine although an activation command has been transmitted, automatically bringing each of said engines into a manual thrust control mode.

Furthermore, advantageously, in case of the reception of an activation command, each of the engines engages the corresponding protection mode and transmits a response indicating whether or not the protection mode has been engaged, and the monitoring step comprising detecting an absence of activation if the following conditions are simultaneously fulfilled:
- a protection function activation command has been transmitted;
- the response transmitted by at least one of said engines indicates that the corresponding protection mode has not been engaged.

The present invention relates also to an energy protection device for an aircraft, in particular a transport airplane, which is provided with a plurality of engines and an autothrust.

According to the invention, said device which comprises:
- a monitoring unit configured to monitor, during a flight of the aircraft, a plurality of data of the aircraft so as to be able to detect a triggering situation, for which energy protection triggering conditions are fulfilled; and
- an activation unit configured, in case of the detection of a situation of triggering by the monitoring unit, to automatically activate a protection function comprising automatically engaging the autothrust if it is not already engaged and automatically controlling the engines for them to supply a maximum thrust, the activation unit comprising an element for transmitting an activation command to each of the engines of the aircraft, a corresponding protection mode being activated by each of the engines in response to the transmission of an activation command, is noteworthy in that it further comprises:

an auxiliary monitoring unit configured to perform a monitoring so as to be able to detect an absence of activation of the protection mode by at least one of said engines although an activation command has been transmitted by the transmission element; and a disconnection unit configured to automatically disconnect the autothrust, in case of the detection of an absence of activation of the protection mode by at least one engine although an activation command has been transmitted, a disconnection of the autothrust resulting in the triggering of the protection function being stopped.

Moreover, in a preferred embodiment, the disconnection unit is configured, in case of the detection of an absence of activation of the protection mode by at least one engine although an activation command has been transmitted, to automatically bring each of the engines into a manual thrust control mode.

Furthermore, advantageously, the auxiliary monitoring unit is configured to detect an absence of activation if the following conditions are simultaneously fulfilled:

a protection function activation command has been transmitted;

the response transmitted by at least one of the engines indicates that the corresponding protection mode has not been engaged.

The present invention further relates to an aircraft, in particular a transport airplane, which comprises an energy protection device as cited above.

BRIEF DESCRIPTION OF THE DRAWINGS

The attached figures will provide a good understanding as to how the invention can be produced. In these figures, identical reference symbols denote similar elements.

DETAILED DESCRIPTION OF THE PREFERRED EMBODIMENTS

The device 1, schematically represented according to two different embodiments respectively in FIGS. 1 and 2 and used to illustrate the invention, is an energy protection device for an aircraft AC, in particular a transport airplane, which is provided with a plurality of standard engines, and an autothrust ATHR 2 (hereinafter autothrust 2). The device 1 is described below in the example of an aircraft AC comprising two engines M1 and M2. The aircraft can of course comprise a different number of engines, for example four engines.

Figure 1:
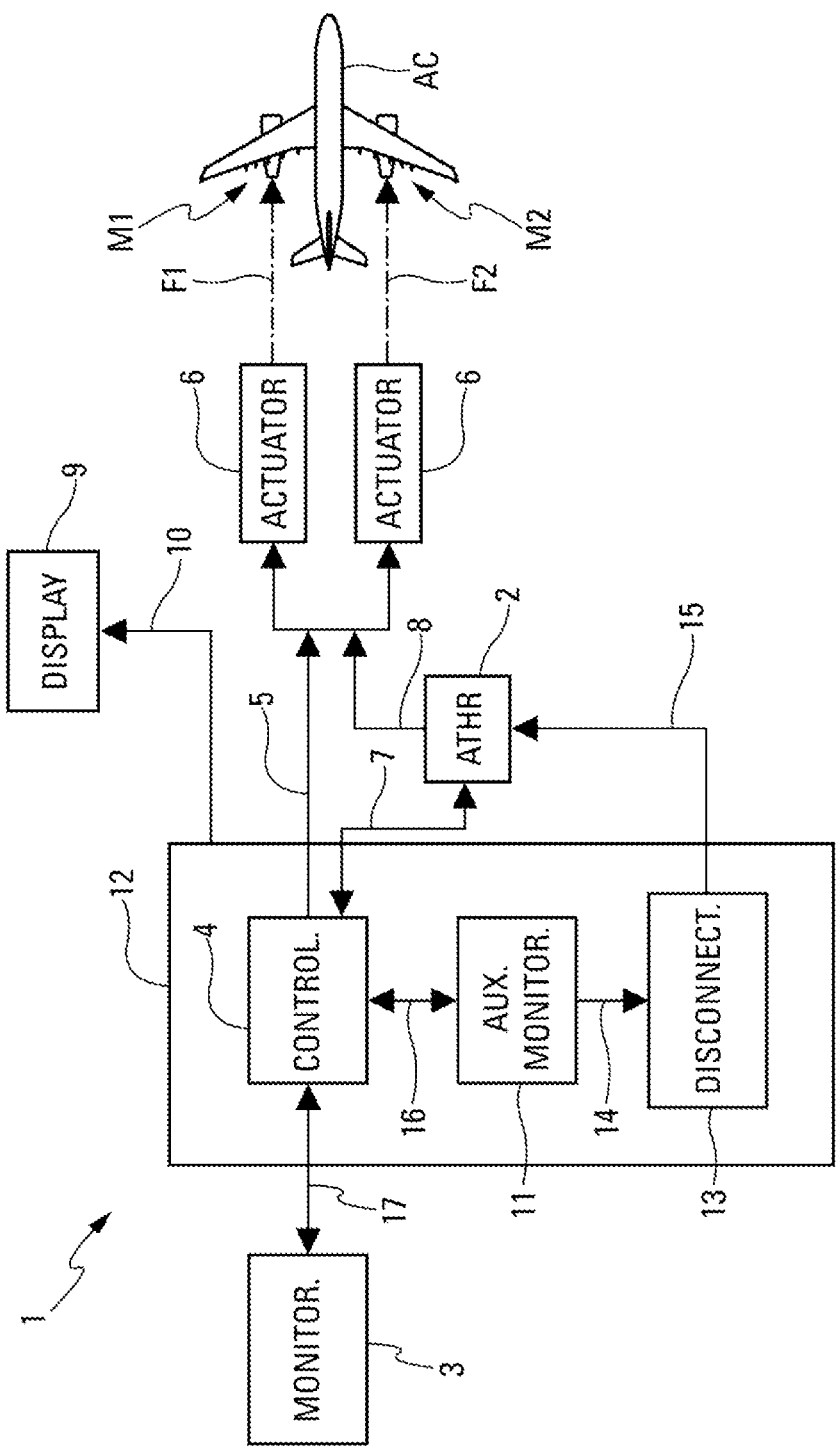
FIG. 1 is the block diagram of a first embodiment of an energy protection device.

In the example of FIG. 1, the device 1 is represented outside the aircraft AC for reasons of clarity. Obviously, this device 1 is on board the aircraft AC.

The device 1 is configured, as specified hereinbelow, to protect the aircraft AC against situations of low energy (low speed, high incidence, low engine thrust).

To do this, said on-board device 1 comprises:

a monitoring unit MONITOR 3 (hereinafter monitoring unit 3) which automatically monitors, during a flight of the aircraft AC, a plurality of data of said aircraft AC so as to be able to detect a triggering situation, for which energy protection triggering conditions are fulfilled; and a control unit CONTROL 4 (hereinafter control unit 4) which is linked via a link 17 to the monitoring unit 3 and which is configured to, notably, automatically activate a protection function (preferably of "ALPHA FLOOR" type), in case of the detection of a triggering situation by the monitoring unit 3.

This protection function comprises automatically controlling the engines M1 and M2 of the aircraft AC so as to bring them into a corresponding protection mode, in which they each supply a maximum thrust. To do this, the control unit 4 is linked via links 5 to standard means or actuators ACTUATOR 6 (hereinafter means 6) which are intended to modify the thrust exerted by the engines M1 and M2, notably by modifying the fuel supply to these engines M1 and M2, as illustrated schematically by chain-dotted line arrows F1 and F2. The control unit 4 also automatically engages (via a link 7) the autothrust 2 which is, for example, linked via a link 8 to said means 6. In case of the reception of an activation command, each of the engines M1 and M2 engages the corresponding protection mode and transmits a response indicating that the protection mode has indeed been engaged (or not).

Obviously, if the protection function is not activated, the different engines M1 and M2 of the aircraft AC are controlled in the standard manner, according to the standard commands generated notably by the pilot of the aircraft using the throttle control (not represented). In this case, each of the engines M1 and M2 is in a manual thrust control mode.

The device 1 can also comprise a display unit DISPLAY 9 (hereinafter display unit 9) which is linked via a link 10 to a unit 12 (specified hereinbelow) and which can display a message warning a pilot of the aircraft AC of any activation of the protection function, for example by displaying an appropriate message on a screen, such as a primary flight screen of PFD ("Primary Flight Display") type for example.

In a particular embodiment, the monitoring unit 3 comprises a plurality of sensors (not represented) to measure respectively at least some of the following parameters: the incidence of the aircraft AC (angle of attack), the longitudinal attitude of the aircraft AC (pitch angle), the stick controls, the speed of the aircraft AC, the Mach number of the aircraft AC, the position of the slats and flaps of the aircraft AC, the radio-altitude height of the aircraft AC. The monitoring unit 3 monitors these parameters to be able to detect situations of low energy of the aircraft AC.

Preferably, the monitoring unit 3 detects a triggering situation, to activate the protection function, if the energy of the aircraft AC is (or risks becoming) excessively low, in one of the following two cases:

The angle of attack of the aircraft AC is greater than a protection value, and the command from the control column is greater than a predetermined threshold to nose up; and the filtered angle of attack becomes greater than predefined thresholds.

Thus, upon the activation of the protection function, the following various actions are implemented:
- automatic engagement of the autothrust 2;
- application of the maximum thrust to the engines M1 and M2; and
- display by the display unit 9 of a corresponding message on a flight mode indicator of the aircraft of FMA ("Flight Mode Annunciator") type, which is for example situated on the upper part of a primary flight screen of PFD type.

According to the invention, said device 1 further comprises an auxiliary monitoring unit AUX MONITOR 11 (hereinbelow auxiliary monitoring unit 11) which is configured to perform a monitoring so as to be able to detect an absence of activation of the protection mode by at least one of the engines M1 and M2 although an activation command has been transmitted by a transmission element (integrated) of the control unit 4 (also called "failure situation" hereinbelow).

The auxiliary monitoring unit 11 is configured to detect a failure situation if the following conditions are simultaneously fulfilled:
- a protection function activation command has been transmitted; and
- the response transmitted by at least one of the engines M1, M2 indicates that the corresponding protection mode has not been engaged.

The auxiliary monitoring unit 11 is described in more detail hereinbelow with reference to FIG. 3.

In a particular embodiment, the units 4 and 11 can notably form part of a central control unit 12, which is preferably integrated in a control and guidance computer of FCGC ("Flight Control and Guidance Computer") type.

In a first preferred embodiment, represented in FIG. 1, the device 1 further comprises a disconnection unit DISCONNECT 13 (hereinafter disconnection unit 13) which is linked via links 14 and 15 respectively to the auxiliary monitoring unit 11 and to the autothrust 2. The disconnection unit 13 which can for example be integrated in the control unit 4, is configured to automatically disconnect the autothrust 2, in case of the detection of a failure situation, that is to say an absence of activation of the protection mode by at least one engine although an activation command has been transmitted. A disconnection of the autothrust 2 results in the triggering of the protection function being stopped (therefore on both engines), which avoids the generation of an unbalanced thrust.

In this first embodiment, the control unit 4 is further configured, in case of the detection of such a failure situation, to automatically bring each of the engines M1 and M2 into a manual thrust control mode enabling the pilot to manually control the thrust.

It will be noted that if the failure situation is no longer present, the autothrust 2 can be re-engaged by a standard action by a crew member.

The first embodiment of FIG. 1 operates as follows:
- the monitoring unit 3 automatically monitors a plurality of data of the aircraft AC during a flight so as to be able to detect a situation of triggering of an (energy) protection function. In case of the detection of such a triggering situation, the control unit 4 automatically sends a protection function activation command;
- the auxiliary monitoring unit 11 then performs a monitoring so as to be able to detect a failure situation, that is to say, an absence of activation of the protection mode by at least one engine;
- if such a failure situation is detected, the energy protection device 1 automatically orders a disconnection of the autothrust 2 and automatically brings the engines M1 and M2 into a manual thrust control mode.

Thus, in this first preferred embodiment, in case of the detection of an absence of activation of the protection mode by at least one engine although an activation command has been transmitted (or failure situation), the energy protection device 1 generates a disconnection of the autothrust 2, which results in the triggering of the protection function (of ALPHA FLOOR type) being stopped and thus makes it possible to simplify the management of the protection function if an engine of the aircraft cannot engage the corresponding protection mode.

This first embodiment thus makes it possible to avoid a situation in which a strong engine thrust imbalance would add to a low-energy situation.

Figure 2:
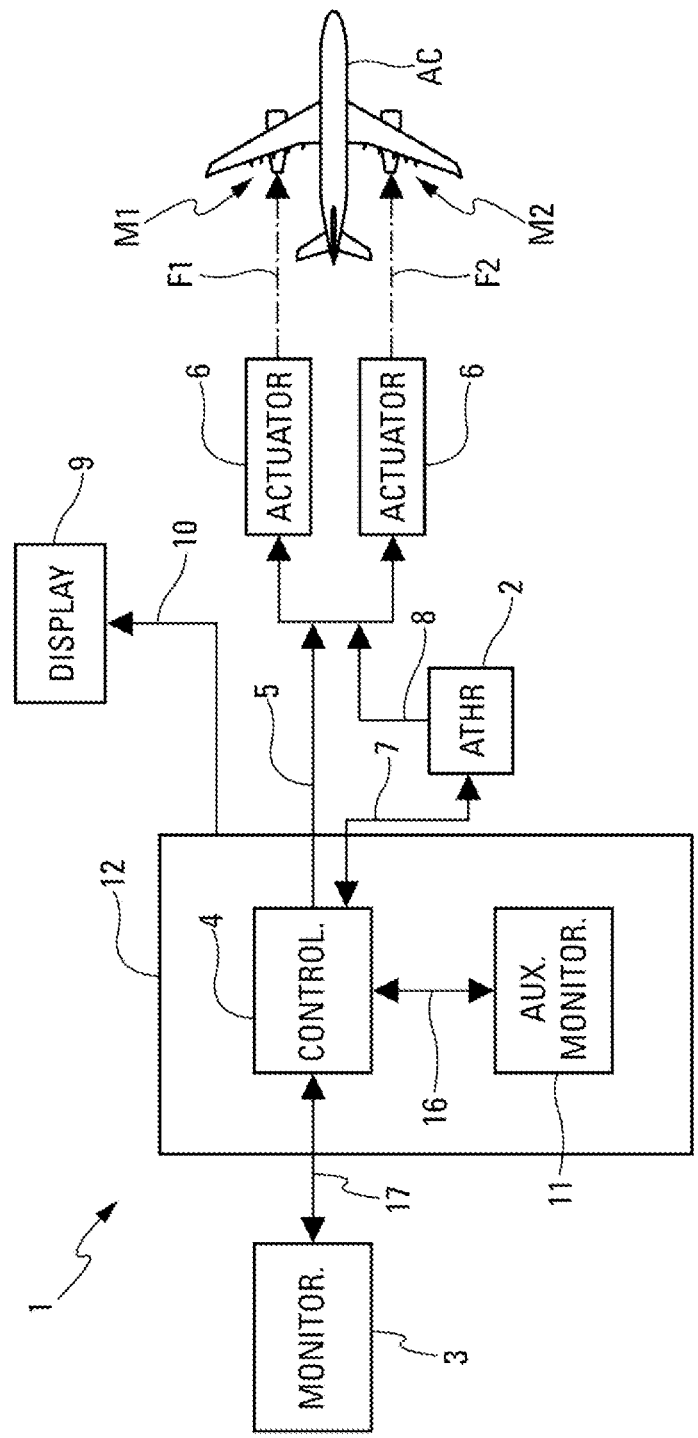
FIG. 2 is the block diagram of a second embodiment of an energy protection device.

Moreover, in a second embodiment represented in FIG. 2, provision is made, in case of the detection of an absence of activation of the protection mode by at least one engine although an activation command has been transmitted (or failure situation), for the engagement of the autothrust 2 to be maintained, with an automatic change of guidance mode of the autothrust 2, the latter having different standard guidance modes.

The detection of an absence of activation of the protection mode by at least one engine although an activation command has been transmitted is performed, in a manner similar to the abovementioned first embodiment, by the auxiliary monitoring unit 11, as specified hereinbelow with reference to FIG. 3.

To avoid the unbalanced thrust in case of activation of the ALPHA FLOOR protection function with an engine that cannot engage the corresponding protection mode, this second embodiment provides for the autothrust 2 to be kept engaged. However, instead of continuing to control the ALPHA FLOOR protection function, the device 1 (and notably the control unit 4 which is linked via a link 16 to the auxiliary monitoring unit 11) performs an automatic reversal and switches from the autothrust mode relative to the ALPHA FLOOR protection function to another possible mode of operation (of guidance) of the autothrust 2. The autothrust 2 can for example be brought (by the control unit 4 via the link 7) into a guidance mode of "SPEED/MACH" type (for which the autothrust 2 is slaved to a target speed or Mach number) or THRUST type (for which the autothrust 2 is slaved to a target thrust), depending on the longitudinal mode engaged.

To perform a reversal to another guidance mode, the control unit 4 comprises an integrated computation element which determines a target parameter, namely a target speed for a guidance mode of "SPEED/MACH" type. A synchronization of the target speed on the real speed of the aircraft AC is not desirable in the present situation because there is a strong possibility of the aircraft AC being at underspeed.

Also, preferably, the target speed is synchronized on a maneuvering speed, in order to retrieve a relevant target speed as a function of the flight point, and in the operational flight domain.

The maneuvering speed depends on the effective aerodynamic configuration of the aircraft AC, at the current moment.

By way of illustration, the maneuvering speed is presented hereinbelow in the case of an aircraft comprising the following standard aerodynamic configurations of its slats and flaps (that is to say of the position thereof): so-called "smooth" configuration, so-called configuration 1, so-called configuration 2, so-called configuration 3, and so-called configuration "full."

In this case, the maneuvering speed preferably corresponds:
- in the smooth configuration, to the maximum fineness speed, called "green dot speed;"
- in configuration 1, to a speed S recommended on take-off for selecting the smooth configuration;
- in the configuration 2, to a speed F2 recommended in configuration 2 on approach for selecting the configuration 3;
- in the configuration 3, to a speed F3 recommended in configuration 3 on approach for selecting the full configuration; and
- in the full configuration, to the sum of a speed VLS and a predefined threshold.

In this second embodiment, the device 1 synchronizes the target speed of the autothrust 2, that is to say the speed that the autothrust 2 seeks to achieve, on a maneuvering speed. This synchronization makes it possible to retrieve a target speed suited to the flight point.

This second embodiment of FIG. 2 operates as follows:
- the monitoring unit 3 automatically monitors a plurality of data of the aircraft AC during a flight so as to be able to detect a situation of triggering of an (energy) protection function. In case of the detection of such a triggering situation, the control unit 4 automatically sends a protection function activation command;
- the auxiliary monitoring unit 11 then performs a monitoring so as to be able to detect a failure situation, that is to say an absence of activation of the protection mode by at least one engine;
- if such a failure situation is detected, the energy protection device 1 keeps the autothrust 2 engaged, but automatically orders a change of guidance mode of the autothrust 2 with a synchronization on a maneuvering speed suited to the current situation.

Thus, in this second embodiment, in case of the detection of an absence of activation of the protection mode by at least one engine although an activation command has been transmitted (or failure situation), the energy protection device 1 performs an automatic reversal and a synchronization on a target speed.

Figure 3:
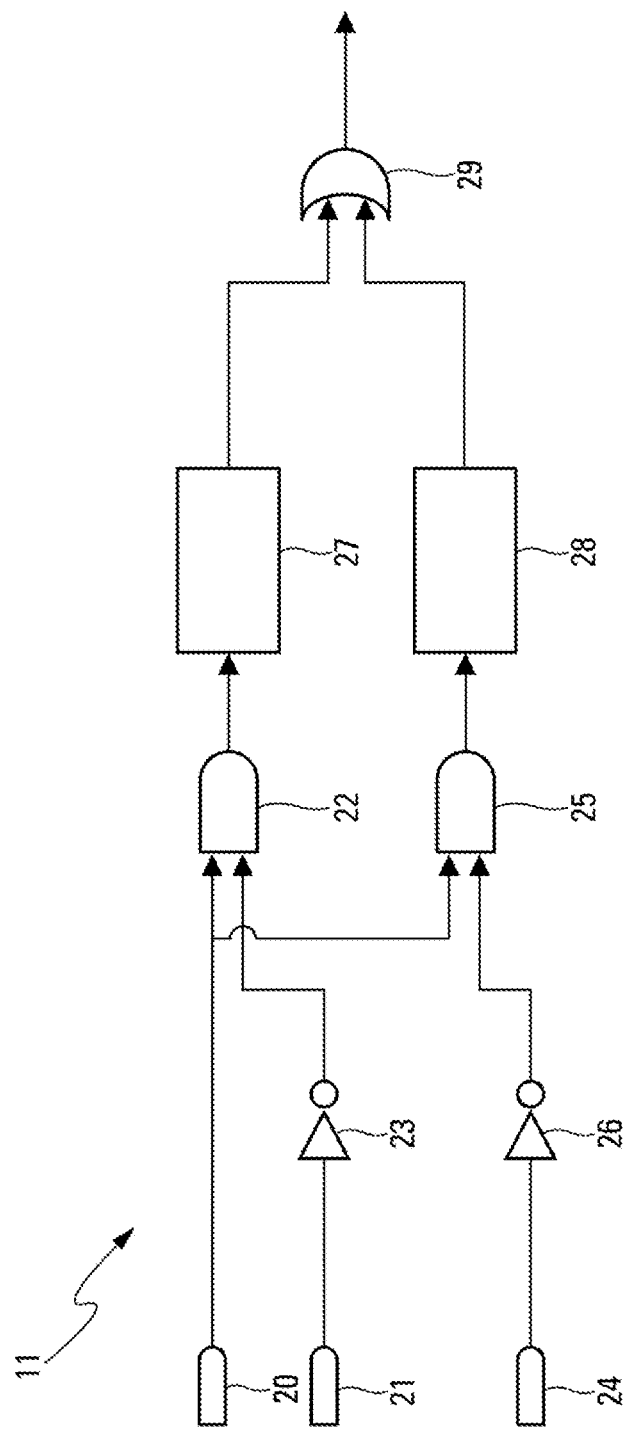
FIG. 3 is the block diagram of an auxiliary monitoring unit forming part of the energy protection device.

Moreover, in a particular embodiment represented in FIG. 3, the auxiliary monitoring unit 11 (forming part of one or other of the embodiments described above) comprises:
- an element 20 for receiving a Boolean indicating if a protection function activation command has been transmitted (value 1) or not (value 0);
- an element 21 for receiving a Boolean indicating whether the protection mode is engaged (value 1) or not (value 0) on a first engine, for example on the engine M1, following the transmission of the activation command;
- an AND logic gate 22 which receives the output from the element 20 and the output from an element 23. This element 23 inverts the information received from the element 21;
- an element 24 for receiving a Boolean indicating whether the protection mode is engaged (value 1) or not (value 0) on the second engine, for example on the engine M2, following the transmission of the activation command;
- an AND logic gate 25 which receives the output from the element 20 and the output from an element 26. This element 26 inverts the information received from the element 24;
- a timer element 27 which, if appropriate, checks whether the output from the AND logic gate 22 has the value 1 for a predetermined time;
- a timer element 28 which, if appropriate, checks whether the output from the AND logic gate 25 has the value 1 for a predetermined time; and
- an OR logic gate 29 which receives the outputs from the timer elements 27 and 28 and which thus detects a failure situation as mentioned above upon an absence of activation of the protection mode by at least one engine although an activation command has been transmitted.

The predetermined time is chosen to be long enough to take account of the response time of the engines. In effect, nominally, if the ALPHA FLOOR protection function is triggered by the central control unit 12 of the device 1, the request is sent to the engines, which themselves activate, then return an information item to the central control unit 12 indicating that the protection is activated (protection mode engaged). The new monitoring must not inopportunely trigger, in this nominal case.

Furthermore, the predetermined time is chosen to be short enough for, upon the detection of a failure situation, the transient thrust imbalance of the engines M1 and M2 not even to be felt at the piloting level, notably because of the inertia inherent to the engines M1 and M2.

Furthermore, the monitoring is disabled when an engine failure is detected, that is to say when an engine is cut at the master lever level.

Although at least one embodiment of the invention has been illustrated and described, it should be noted that other modifications, substitutions and alternatives will become apparent to those skilled in the art and can be changed without departing from the scope of the object described here. The present application envisages covering all the adaptations and variations of the embodiments described hereinabove. Furthermore, the term "comprising" does not exclude other elements or steps and the term "one" does not exclude the plural. Furthermore, features or steps which have been described with reference to one of the embodiments explained above can also be used in combination with other features or steps of other embodiments explained above. It will be noted that the scope of the patent must include all the modifications envisaged above in as much as they form part of the contribution of the inventors to the prior art. Such modifications, substitutions and alternatives can be implemented without departing from the framework and the spirit of the present invention.

The invention claimed is:

1. An energy protection method for an aircraft which is provided with a plurality of engines and an autothrust, said method having a protection function comprising automatically engaging the autothrust if the autothrust is not already engaged and in automatically increasing a thrust of the engines to a maximum thrust when conditions for triggering the protection function are fulfilled, said method comprising:

transmitting an activation command to each of the engines of the aircraft for the triggering of the protection function, activating a corresponding protection mode by each of the engines in response to the transmission of the activation command, performing a monitoring in a monitoring step so as to be able to detect an absence of activation of the protection mode by at least one of said engines although an activation command has been transmitted, and automatically disconnecting the autothrust in a disconnection step, in case of the detection of an absence of activation of the protection mode by at least one engine although an activation command has been transmitted, a disconnection of the autothrust resulting in the triggering of the protection function being stopped.

2. The method as claimed in claim 1, further including an auxiliary step comprising, in case of the detection of the absence of activation of the protection mode by at least one engine although an activation command has been transmitted, automatically bringing each of said engines into a manual thrust control mode.

3. The method as claimed in claim 1, wherein, in case of the reception of an activation command, each of said engines engaging the corresponding protection mode and transmitting a response indicating whether or not the protection mode has been engaged, and wherein the monitoring step comprises detecting an absence of activation if the following conditions are simultaneously fulfilled:
- a protection function activation command has been transmitted;
- the response transmitted by at least one of said engines indicates that the corresponding protection mode has not been engaged.

4. An energy protection device for an aircraft provided with a plurality of engines and an autothrust, said device comprising:
- a monitoring unit configured to monitor, during a flight of the aircraft, a plurality of data of the aircraft so as to be able to detect a triggering situation, for which energy protection triggering conditions are fulfilled;
- an activation unit configured, in case of the detection of a situation of triggering by the monitoring unit, to automatically activate a protection function comprising automatically engaging the autothrust if the autothrust is not already engaged and automatically controlling the engines for them to supply a maximum thrust, the activation unit comprising an element configured to transmit an activation command to each of the engines of the aircraft, a corresponding protection mode being activated by each of the engines in response to the transmission of an activation command;
- an auxiliary monitoring unit configured to perform a monitoring so as to detect an absence of activation of the protection mode by at least one of said engines although an activation command has been transmitted by the transmission element; and
- a disconnection unit configured to automatically disconnect the autothrust, in case of the detection of an absence of activation of the protection mode by at least one engine although an activation command has been transmitted, a disconnection of the autothrust resulting in the triggering of the protection function being stopped.

5. The device as claimed in claim 4, further comprising a control unit configured, in case of the detection of an absence of activation of the protection mode by at least one engine although an activation command has been transmitted, to automatically bring each of said engines into a manual thrust control mode.

6. The device as claimed in claim 4, wherein the auxiliary monitoring unit is configured to detect an absence of activation if the following conditions are simultaneously fulfilled:
- a protection function activation command has been transmitted;
- a response transmitted by at least one of said engines indicates that the corresponding protection mode has not been engaged.

7. An aircraft comprising a plurality of engines, an autothrust and an energy protection device, said device comprising:
- a monitoring unit configured to monitor, during a flight of the aircraft, a plurality of data of the aircraft so as to be able to detect a triggering situation, for which energy protection triggering conditions are fulfilled;
- an activation unit configured, in case of the detection of a situation of triggering by the monitoring unit, to automatically activate a protection function comprising automatically engaging the autothrust if the autothrust is not already engaged and automatically controlling the engines for them to supply a maximum thrust, the activation unit comprising an element configured to transmit an activation command to each of the engines of the aircraft, a corresponding protection mode being activated by each of the engines in response to the transmission of an activation command;
- an auxiliary monitoring unit configured to perform a monitoring so as to detect an absence of activation of the protection mode by at least one of said engines although an activation command has been transmitted by the transmission element; and
- a disconnection unit configured to automatically disconnect the autothrust, in case of the detection of an absence of activation of the protection mode by at least one engine although an activation command has been transmitted, a disconnection of the autothrust resulting in the triggering of the protection function being stopped.

8. The aircraft as claimed in claim 7, further comprising a control unit configured, in case of the detection of an absence of activation of the protection mode by at least one engine although an activation command has been transmitted, to automatically bring each of said engines into a manual thrust control mode.

9. The aircraft as claimed in claim 7, wherein the auxiliary monitoring unit is configured to detect an absence of activation if the following conditions are simultaneously fulfilled:
- a protection function activation command has been transmitted;
- a response transmitted by at least one of said engines indicates that the corresponding protection mode has not been engaged.

* * * * *